(12) United States Patent
Best

(10) Patent No.: US 7,350,081 B1
(45) Date of Patent: Mar. 25, 2008

(54) SECURE EXECUTION OF DOWNLOADED SOFTWARE

(76) Inventor: Robert M. Best, 5100 S. Cleveland Ave., suite 318, # 325, Fort Myers, FL (US) 33907

( * ) Notice: Subject to any disclaimer, the term of this patent is extended or adjusted under 35 U.S.C. 154(b) by 795 days.

(21) Appl. No.: 10/679,971

(22) Filed: Oct. 6, 2003

Related U.S. Application Data

(63) Continuation-in-part of application No. 10/639,038, filed on Aug. 11, 2003, now abandoned, and a continuation-in-part of application No. 10/613,902, filed on Jul. 3, 2003, now abandoned, and a continuation-in-part of application No. 10/427,793, filed on Apr. 30, 2003, now Pat. No. 7,278,031, and a continuation-in-part of application No. 10/135,319, filed on Apr. 29, 2002, now abandoned.

(51) Int. Cl.
   *H04L 9/32* (2006.01)
(52) U.S. Cl. .................. 713/190; 380/279; 705/56; 705/57
(58) Field of Classification Search ............. 463/43; 705/56
   See application file for complete search history.

(56) References Cited

U.S. PATENT DOCUMENTS

| | | |
|---|---|---|
| 4,218,582 A | 8/1980 | Hellman et al. |
| 4,278,837 A | 7/1981 | Best |
| 4,405,829 A | 9/1983 | Rivest et al. |
| 4,433,207 A | 2/1984 | Best |
| 4,670,857 A | 6/1987 | Rackman |
| 4,677,604 A | 6/1987 | Selby et al. |
| 4,694,412 A | 9/1987 | Domenik et al. |
| 4,817,140 A | 3/1989 | Chandra et al. |

(Continued)

FOREIGN PATENT DOCUMENTS

GB 2365361 A 2/2002

(Continued)

OTHER PUBLICATIONS

Data Encryption Standard (DES); FIPS PUB 46-3, Reaffirmed Oct. 25, 1999; U.S. Department of Commerce/National Institute of Standards and Technology.

*Primary Examiner*—Gilberto Barrón
*Assistant Examiner*—Martin Jeriko P San Juan
(74) *Attorney, Agent, or Firm*—Graybeal Jackson Haley LLP

(57) ABSTRACT

Proprietary programs for execution in game systems or other computers are downloaded from an Internet server in encrypted form to protect the programs from unauthorized use. The encrypted programs can be decrypted and executed only in a secure cryptoprocessor that initially ordered the software for download. Unlike DRM protected music, video, and text, decrypted program instructions need never be revealed to users. Each cryptoprocessor contains a unique chip identifier that is transmitted to the server in encrypted form to control encryption of a random session key that controls decryption of the downloaded programs. Hence, each copy of the encrypted software is encrypted differently. If the crypto processor is in a cartridge, it can be manually unplugged from one computer or game system and plugged into another system. Although some of the software may be non-encrypted and be executed and processed in conventional processor(s), this non-encrypted software would be useless without the decrypted program instructions executing in the cryptoprocessor.

16 Claims, 8 Drawing Sheets

U.S. PATENT DOCUMENTS

| | | |
|---|---|---|
| 5,070,479 A | 12/1991 | Nakagawa |
| 5,134,391 A | 7/1992 | Okada |
| 5,184,830 A | 2/1993 | Okada et al. |
| 5,224,166 A | 6/1993 | Hartman |
| 5,457,668 A | 10/1995 | Hibino et al. |
| 5,550,999 A | 8/1996 | Nagano et al. |
| 5,577,121 A | 11/1996 | Davis et al. |
| 5,632,681 A * | 5/1997 | Bakoglu et al. ............... 463/44 |
| 5,666,411 A * | 9/1997 | McCarty ..................... 705/51 |
| RE35,839 E | 7/1998 | Asai et al. |
| 5,778,421 A | 7/1998 | Nagano et al. |
| 5,809,140 A | 9/1998 | Rubin |
| 5,826,011 A | 10/1998 | Chou et al. |
| 5,850,230 A | 12/1998 | San et al. |
| 5,881,038 A | 3/1999 | Oshima et al. |
| 5,937,066 A | 8/1999 | Gennaro et al. |
| 6,022,274 A | 2/2000 | Takeda et al. |
| 6,034,937 A | 3/2000 | Kumagai |
| 6,071,191 A | 6/2000 | Takeda et al. |
| 6,081,785 A * | 6/2000 | Oshima et al. ................ 705/1 |
| 6,132,315 A | 10/2000 | Miyamoto et al. |
| 6,139,433 A * | 10/2000 | Miyamoto et al. ............ 463/32 |
| 6,175,629 B1 | 1/2001 | Gotoh et al. |
| 6,190,257 B1 | 2/2001 | Takeda et al. |
| 6,238,291 B1 * | 5/2001 | Fujimoto et al. ............. 463/44 |
| 6,256,391 B1 | 7/2001 | Ishiguro et al. |
| 6,339,815 B1 | 1/2002 | Feng et al. |
| 6,360,320 B1 | 3/2002 | Ishiguro et al. |
| 6,369,827 B1 | 4/2002 | Pan et al. |
| 6,453,379 B2 | 9/2002 | Nishiumi et al. |
| 6,468,160 B2 | 10/2002 | Elliot |
| 6,535,858 B1 | 3/2003 | Blaukovitsch et al. |
| 6,544,126 B2 * | 4/2003 | Sawano et al. ................ 463/42 |
| 6,704,871 B1 * | 3/2004 | Kaplan et al. .............. 713/192 |
| 6,712,704 B2 * | 3/2004 | Eliott ......................... 463/43 |
| 6,728,379 B1 * | 4/2004 | Ishibashi et al. ............ 380/278 |
| 6,884,171 B2 * | 4/2005 | Eck et al. ..................... 463/42 |
| 7,130,425 B2 * | 10/2006 | Strasser et al. ............... 380/44 |
| 2001/0003714 A1 * | 6/2001 | Takata et al. ................. 463/40 |
| 2001/0039212 A1 | 11/2001 | Sawano et al. |
| 2002/0026424 A1 | 2/2002 | Akashi |
| 2002/0028710 A1 * | 3/2002 | Ishihara et al. ............... 463/44 |
| 2002/0141577 A1 | 10/2002 | Ripley et al. |
| 2002/0174351 A1 * | 11/2002 | Jeong et al. ................. 713/189 |
| 2003/0048718 A1 | 3/2003 | Watanabe et al. |
| 2003/0050116 A1 | 3/2003 | Chen |
| 2003/0177347 A1 * | 9/2003 | Schneier et al. ............ 713/151 |

FOREIGN PATENT DOCUMENTS

| | | |
|---|---|---|
| GB | 2366025 A | 2/2002 |

* cited by examiner

Fig. 6 in crypto processor 52          91

| |
|---|
| program for encrypting/decrypting a block of data |
| program for loading RAM 104 with program and data |
| program for generating game data representing a player object |
| program for generating game data representing non-player objects |
| program for processing input control data from manual controls |
| program for verifying chip identifier |
| program for generating random numbers |
| program for communicating with crypto processor 303 |
| program for selecting keys |
| program for determining validity of response time |
| program for loading and executing decrypted program |
| program for communicating with processor 86 |
| program for generating locations and directions of objects |

Fig. 6a in crypto processor 303          313

| |
|---|
| program for encrypting/decrypting a block of data |
| program for processing key selection and find bits of a key |
| program for sending data to and from cartridge processor |
| program for locating key bits among decoy bits |
| program for responding to processor 52 with a rapid bit stream |
| encrypted key K1, game identifier, serial number |
| key K3 scattered among decoy bits |

Fig. 7

Software in RAM 90

| |
|---|
| program for loading RAM with program and data |
| program for generating image of 3D world |
| program for generating image of animated character |
| program for generating image of moving object |
| program for animating a character |
| data for animated characters in 3D world |
| data for objects in 3D world |
| data for music and sound effects |
| data for character descriptions (polygons, textures, etc) |
| data for terrain descriptions (polygons, textures, etc) |
| data for maps, word menus, etc. |

Fig. 7a

Downloaded software in RAM 96

| |
|---|
| data placing specific characters and objects in new scenes |
| data for branching story sequences |
| data for word and picture menus |
| data for rules of engagement |
| data specifying object locations and orientations |
| data specifying textures for selected objects |
| data for transmission to and from handheld LCD control unit |
| additional programs |
| program patches |

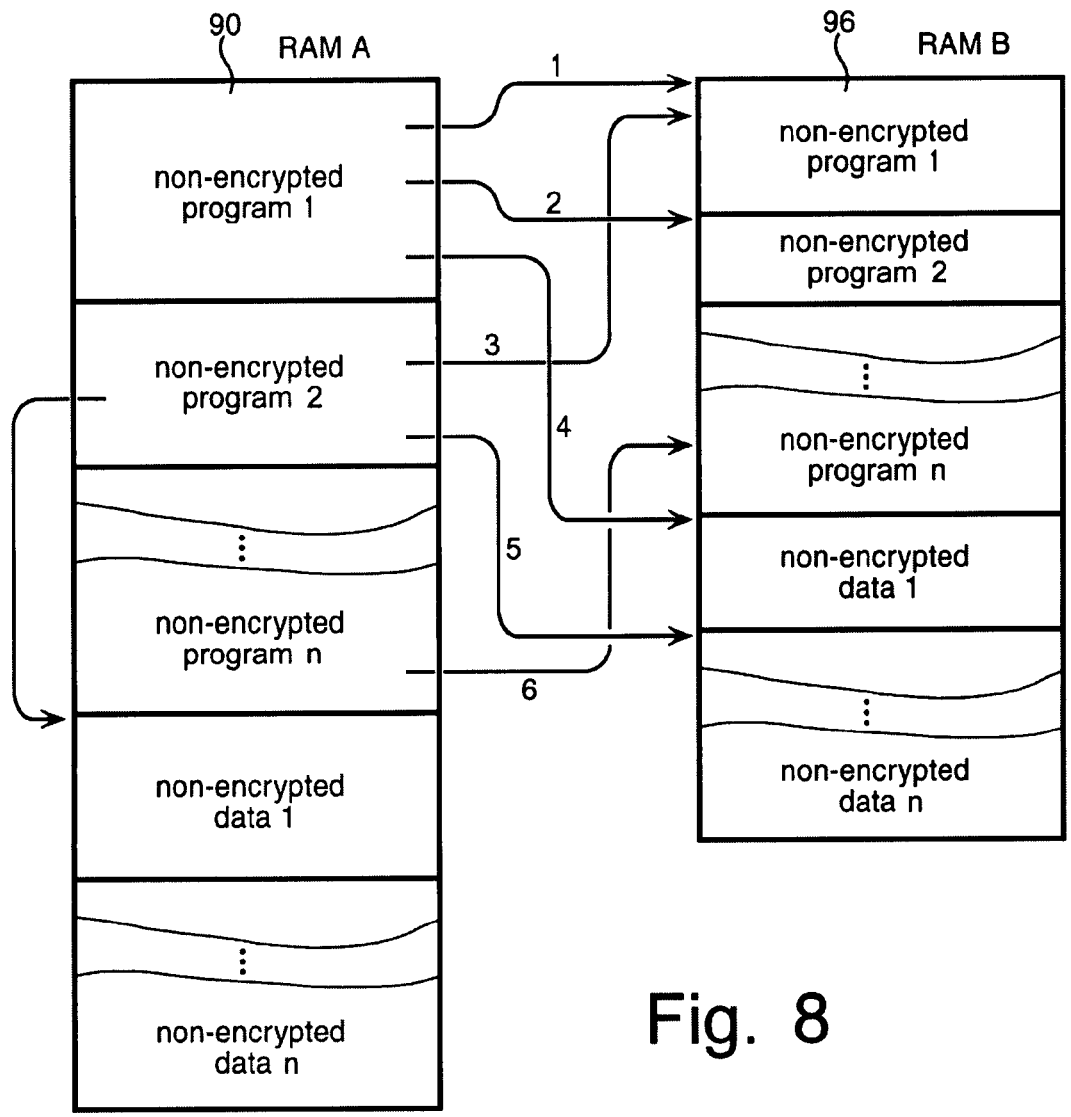
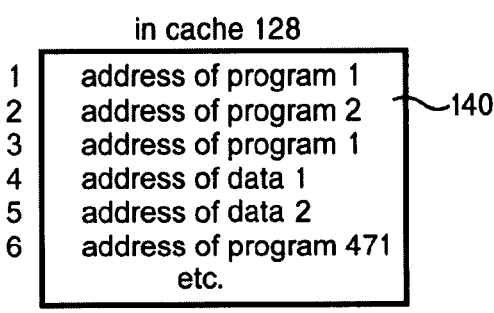
Fig. 8

SECURE EXECUTION OF DOWNLOADED SOFTWARE

RELATED APPLICATIONS

This is a continuation-in-part of U.S. patent application Ser. No. 10/639,038 filed Aug. 11, 2003 (abandoned), and a continuation-in-part of Ser. No. 10/613,902 filed Jul. 3, 2003 (abandoned), and a continuation-in-part of Ser. No. 10/427,793 filed Apr. 30, 2003 now U.S. Pat. No. 7,278,031, and a continuation-in-part of Ser. No. 10/135,319 filed Apr. 29, 2002 (abandoned). These applications in their entirety are incorporated by reference herein.

BACKGROUND OF THE INVENTION

1. Field of the Invention

This invention relates generally to electronic game systems and more particularly to game software distributed in encrypted form for copy protection.

2. Description of the Prior Art

Portable game systems that generate player controlled objects in simulated worlds for display on an LCD screen are well known and are described in U.S. Pat. No. 6,369,827. It is also well known to store game program instructions and graphics data in digital memory cartridges that plug into such portable game systems. Even if such digital memory cartridges include a trademark and copyright notice as described in U.S. Pat. No. 5,184,830, software pirates disregard such notices. Game software in executable form is easily copied and is often sold by software pirates in counterfeit cartridges and disks and is distributed freely on the Internet. It is also known to protect programs by storing them in a digital memory in the same processor chip that executes the program instructions as described in U.S. Pat. No. 6,339,815. It is also known to include microprocessors in portable game cartridges as described in US patent applications 2002/0028710 and 2003/0050116. Crypto microprocessors that execute encrypted programs using bus encryption are also disclosed in my U.S. Pat. No. 4,278,837. It is also known to transmit video game software in encrypted form over a data transmission network as disclosed in U.S. Pat. No. 6,712,704.

Piracy of game software (program instructions and data) is similar to piracy of music software. When digitized music is read from a data storage medium or decrypted so that it can be converted to analog sounds that can be heard, the digitized music is easy for pirates to copy. But there is one major difference between music and game software. Game programs do not have to be heard or seen by their users and hence game programs do not have to be executed in easily accessible game system processors.

In the present invention, encrypted game programs can be distributed in cartridges and decrypted, stored, and executed in integrated crypto processors in game systems to generate game data, without the game programs being accessible outside of the crypto processors.

SUMMARY OF THE INVENTION

It is a primary objective of the present invention to provide copy protection for game software that is used in electronic game systems. It is another objective of this invention that this protection be provided at low cost.

The preferred embodiment of this invention is an electronic game system for distributing game software (programs and data) in encrypted form, such that the encrypted software may be downloaded from a server into a memory cartridge or other data storage device together with an encrypted key. Non-encrypted software may accompany the encrypted software. The game system requires a crypto processor that decrypts the encrypted key as a function of a unique and secret crypto processor identifier. The crypto processor then uses the decrypted key to decrypt the encrypted software for execution. Decrypted programs are executed in the crypto processor chip and are not externally accessible.

ADVANTAGES

By distributing game software in encrypted form, proprietary game software can be delivered securely to users without risk that the software will be illegally copied. Encrypted software can be distributed on optical disks, ROM cartridges, or downloaded for a fee.

BRIEF DESCRIPTION OF THE DRAWINGS

FIG. 6 is an example of a memory map illustrating software stored in ROM in crypto processor 52.

FIG. 6a is an example of a memory map illustrating software stored in ROM in crypto processor 303.

FIG. 7 is a memory map of RAM 90 storing game software.

FIG. 7a is a memory map of RAM 96 storing non-encrypted downloaded software.

FIG. 8 is a memory map illustrating one kind of enhancement software having an encrypted address table.

DETAILED DESCRIPTION OF EXEMPLARY EMBODIMENT

Figure 1:
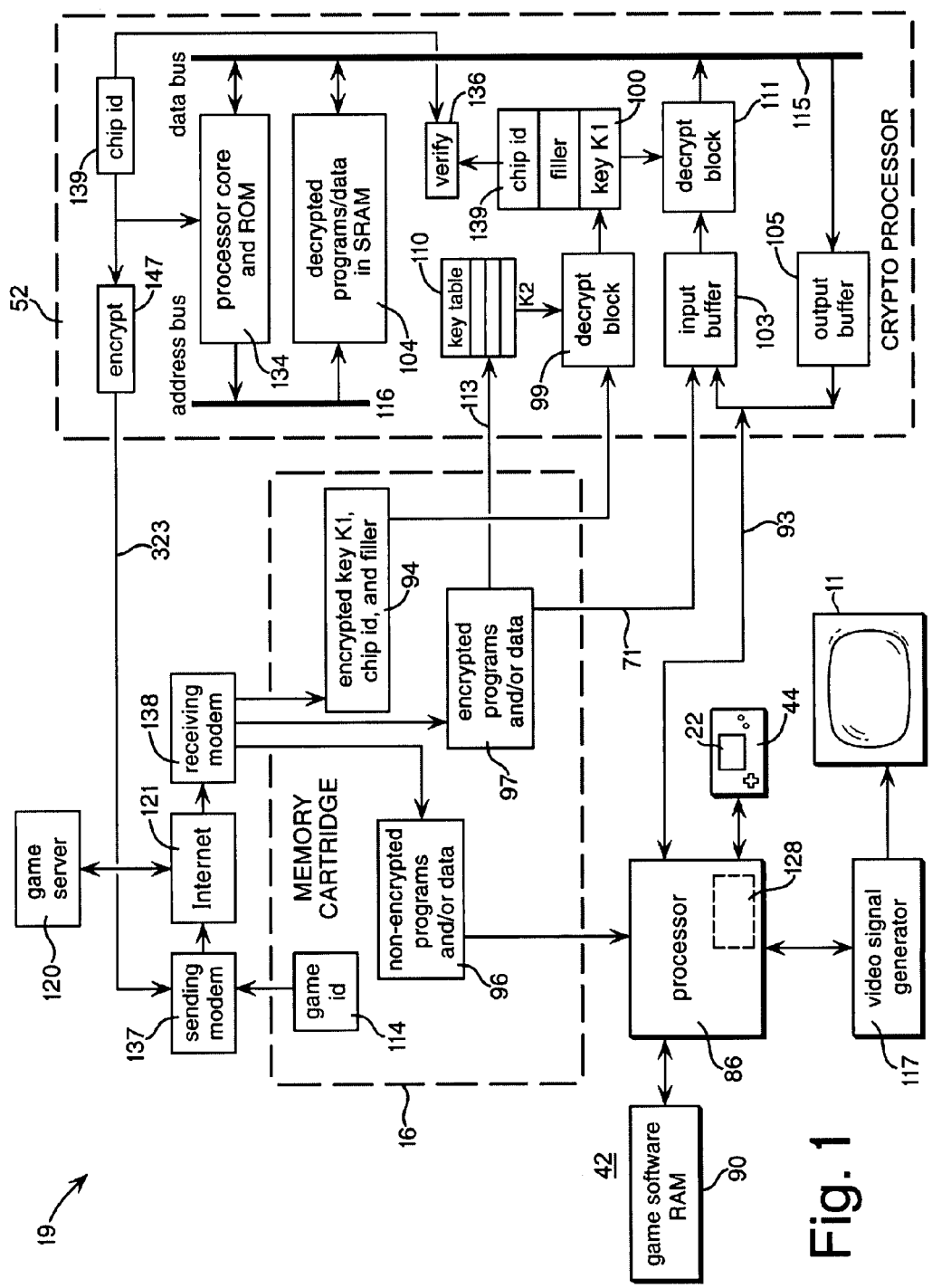
FIG. 1 is a block diagram of a preferred embodiment in which an encrypted chip identifier is sent to a game server that downloads software.

FIG. 1 illustrates a preferred embodiment of a video game system 19 that includes crypto processor 52, memory cartridge 16, Internet 121 or other data transmission, modem 137/138, TV 11, and components housed in video game console unit 42. Crypto processor 52 should be attached to the motherboard of video game console 42 or portable game system 44 so that attempts to replace processor 52 with an unauthorized processor would destroy traces within the motherboard. For clarity, the housing of unit 42 is not shown.

A unique chip identifier 139 is stored in crypto chip 52. Chip identifier 139 is sent to game server 120 in encrypted form to deter known-plaintext attacks on key block 94. Encryption process 147 block-encrypts chip identifier 139 together with a random serial number using a random session key 304 (K4) to produce encrypted block 323 (see FIG. 2). Encrypted block 323 is transmitted to game server 120 along with requested game identifier 114.

Figure 3:
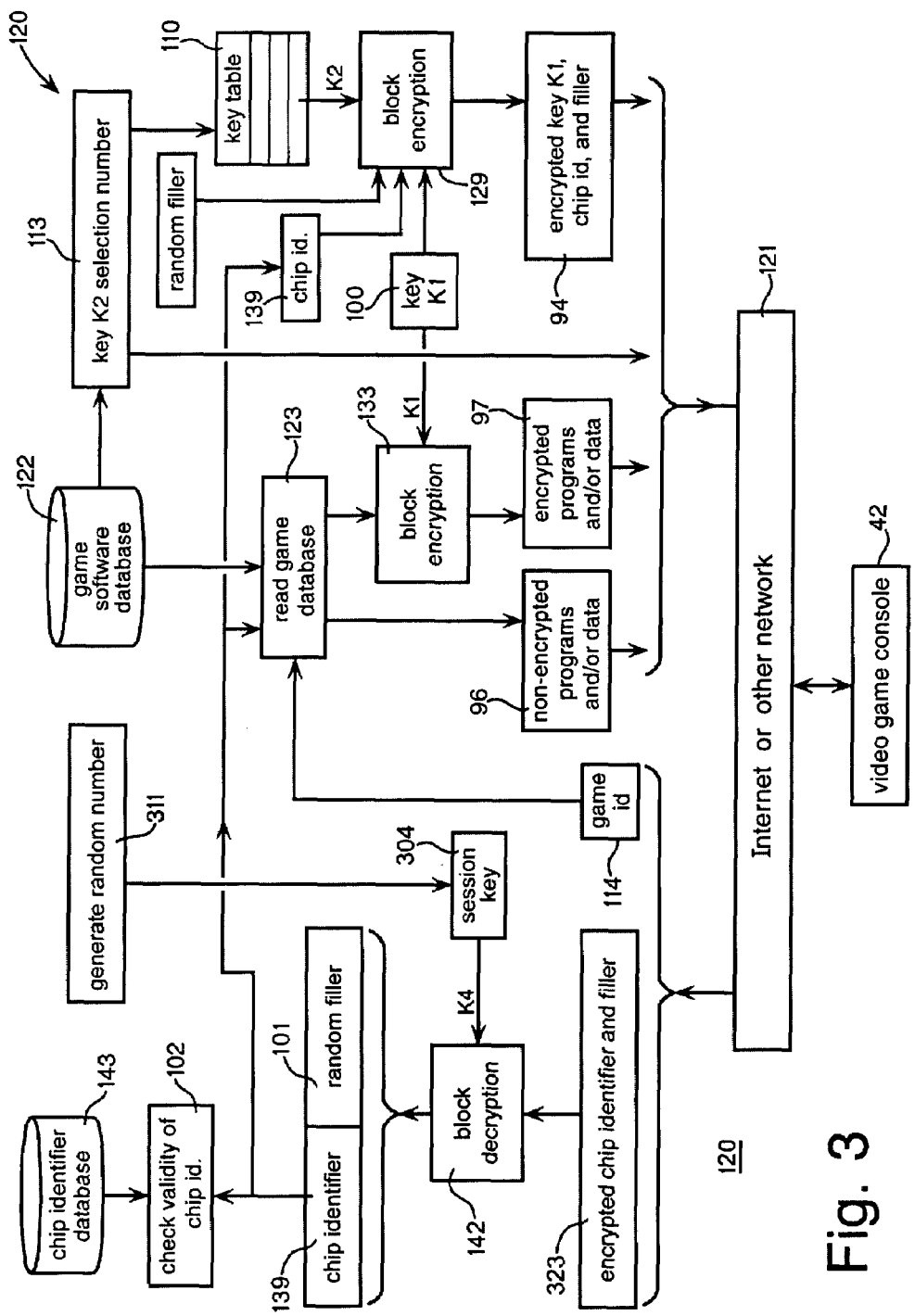
FIG. 3 is a block diagram of a game server downloading encrypted game software to a video game console shown in FIG. 1.

Server 120 downloads the requested non-encrypted software 96 into cartridge 16 and block encrypts the requested encrypted software 97 as a function of randomly generated key K1 (see FIG. 3). Server 120 also block encrypts key K1 together with chip identifier 139 and random filler bits to produce key block 94. The encrypted key block 94 is also downloaded from server 120 into cartridge 16. In crypto processor 52, block decryption process 99 decrypts key block 94 to produce decrypted key K1 (reference 100), decrypted chip identifier 139, and filler bits (not used). It is important that these data fields be encrypted together as one block and not as individual fields or bytes, so that each bit in the encrypted block 94 is a complex function of every bit of the decrypted block and of every bit of key K2.

Each crypto processor 52 has the same table 110 of secret keys. Key selection number 113, hidden somewhere in encrypted software 97, selects key K2 from key table 110. Key K2 then controls block decryption 99 to decrypt key block 94 to produce plain decryption key K1 in register 100.

After key block 94 has been decrypted by process 99, verification process 136 compares decrypted chip identifier 139 to hardware chip identifier 139. If they are different, decryption of programs/data 97 by process 111 is inhibited. The random filler bits in encrypted key block 94 should be at least 64 bits to insure that chip identifier 139, if discovered, cannot be used in a known-plaintext attack.

Key K1 then controls block decryption 111 of encrypted software 97 which is read from memory cartridge 16 by crypto processor 52, one block at a time, into input buffer 103, to produce decrypted blocks on internal data bus 115. After performing cyclic redundancy check (CRC) on each decrypted block, processor core 134 stores each block of decrypted program and data into battery-powered SRAM 104 or other non-volatile memory.

Although it may be tempting to simplify crypto processor 52 by eliminating key table 110, this would result in one secret master key K2 that would be the same in every crypto processor chip 52. That would be excessively risky and is not recommended. The keys in key table 110 can be further disguised by mixing randomly located decoy bits among the key bits in table 110. If an intruder succeeded in penetrating the physical security of crypto chip 52 without loss of secret data in SRAM 104 and key table 110 and discovered the bit values in table 110, the intruder would not be able to make use of those bits as key without also discovering the program instructions in ROM and SRAM 104 and learning where to remove the decoy bits from key K2 read from table 110.

After decrypted programs and data are stored in SRAM 104, processor core 134 executes the program instructions from SRAM 104 and communicates with processor 86 by a series of digital semaphores in input buffer 103 and output buffer 105. Using semaphores, perhaps encrypted, avoids the possibility of an intruder addressing data in SRAM 104. Internal address bus 116 and data bus 155 should be inaccessible, either as input or output, from outside of crypto chip 52. Data in RAM 96 and/or RAM 90 needed by processor core 134 is indirectly passed by way of processor 86 and buffer 103.

Downloaded non-encrypted programs 96 are executed in processor 86 which may include one or more coprocessors. Programs executed in processor 86 process data from RAM 96 and generate picture data in RAM 90 from which video signal generator 117 generates video signals for display on TV 11 or other video display such as LCD flat panel displays. Processors may also be connected to one or more portable game systems 44 or other devices by cables or wireless equivalent (not shown) such as infrared, ultrasonic, RF, or other data communicating forms of energy.

Figure 2:
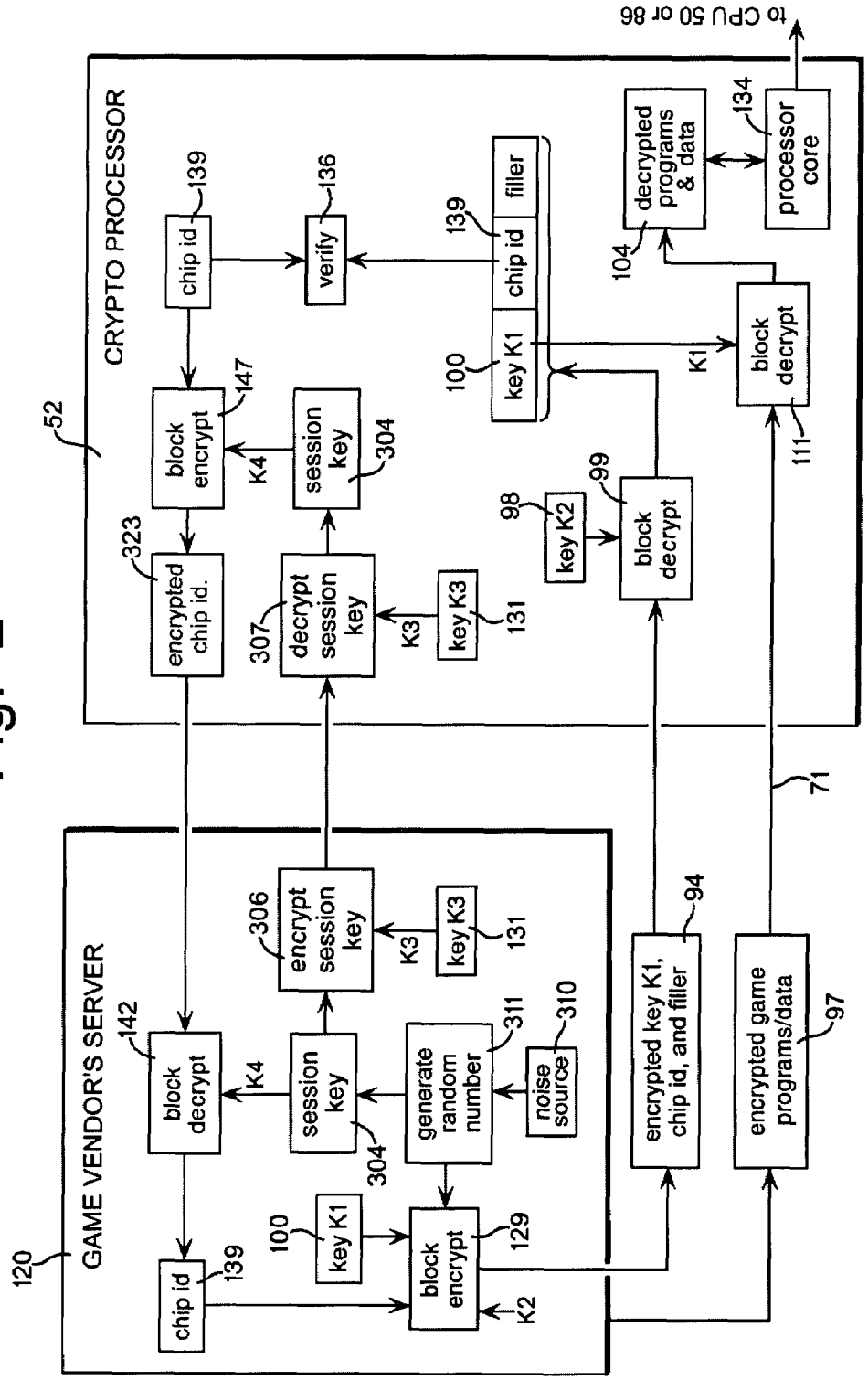
FIG. 2 is a block diagram of crypto communications between the game server and the crypto processor shown in FIG. 1.

FIG. 2 illustrates crypto communication between game server 120 and crypto processor chip 52 in greater detail than shown in FIG. 1 and FIG. 3. In the lower portion of FIG. 2, decryption 99 of key block 94 and encrypted game programs and data 97 are shown. Both key block 94 and encrypted programs 97 are downloaded from server 120 and decrypted in crypto processor 52 as shown in FIG. 1. To prevent pirates from distributing this encrypted data 94 and 97 in bogus cartridges and from the Internet, it is necessary in this example for the downloaded data block 94 to be usable only in the specific crypto processor 52 owned by a person who paid for a license to use encrypted game programs and data 97.

Key block 94 is made different for each user by including chip identifier 139 in each crypto processor chip 52 and in each block encryption process 129 in the game vendor's server 120. Chip identifier 139 is a unique, inaccessible, and unalterable binary number in each crypto processor 52. Chip identifier 139 is shown in FIG. 1 being encrypted in process 147 before being transmitted to server 120. This encryption process is shown in detail in FIG. 2 and prevents pirates from using chip identifiers 139 with corresponding key blocks 94 as plaintext/ciphertext pairs for cryptanalysis.

Chip identifier 139 in crypto processor 52 in FIG. 2 is encrypted together with random filler bits (not shown) by block encryption process 147 to produce encrypted chip identifier 323 under control of a session key 304 (K4) that is randomly generated by random number generator 311 in server 120. Session key 304 is first generated in server 120, encrypted by process 306 under control of key 131 (K3) and transmitted in encrypted form to decryption process 307 to produce a plain session key 304 in crypto processor 52. Encryption of session keys prevent their use in cryptanalysis of encrypted chip identifiers 139. Symmetric keys 131 are shown for encryption methods such as DES, but nonsymmetric public key/private key pairs may also be used for processes 306 and 307.

After encrypted chip identifier 139 is decrypted in block decryption process 142 in server 120, plain chip identifier 139 is encrypted together with key 100 (K1) and random filler bits by block encryption process 129 under control of key K2 (from key table 110) as described below with reference to FIG. 3. This encryption process 129 produces key block 94 which is downloaded by server 120 to RAM in cartridge 16 along with encrypted programs/data 97 as described above with reference to FIG. 1.

When cartridge 16 is inserted into video game system 42 (FIG. 1) or portable game system 44 (FIG. 4), encrypted key block 94 is copied from cartridge 16 into crypto processor 52 (FIG. 1). Encrypted key block 94 is then decrypted in block decryption process 99 under control of key 98 (K2) to produce a decrypted key block comprising key 100 (K1), chip identifier 139, and filler bits (not used).

Decrypted chip identifier 139 is then compared to hardware chip identifier 139 to determine if they match. If they do not match, decryption of encrypted programs 97 is inhibited and a message is displayed on TV 11 or LCD 22 that game programs in memory cartridge 16 cannot be used with this hardware system 42 or 44.

FIG. 3 illustrates functions of game server 120 that provides downloadable game software (program instructions and data). Game software is stored in database 122 together with corresponding key selection number 113 which may be different for each game title. Customer records for each game title purchased are also stored in database 143 by chip identifier 139. When game software is requested over an Internet or other link 121, requested game identifier 114 and encrypted chip identifier block 323 are uploaded to server 120, as described above with reference to FIGS. 1 and 2.

Database reader 123 reads requested game software from database 122 specified by game identifier 114. Non-encrypted software 96 is transmitted to a user's video game console 42 as described above with reference to FIG. 1.

Encrypted chip identifier block 323 contains chip identifier 139 encrypted together with a random filler bits 101. Block 323 is decrypted in server 120 using block decryption process 142 such as DES or a similar block encryption method under control of session key 304 (K4) generated by random number generator 311. Decryption of block 323 produces decrypted filler bits 101 (not used) and decrypted chip identifier 139. The function of random filler 101 is to deter cryptanalytic attacks on block 323. Decrypted chip identifier 139 is checked for validity by process 102 by lookup in database 143 in addition to CRC validation.

Encrypted software 97 is encrypted in server 120 using block encryption method 133 such as DES or a similar block encryption method under control of a secret decryption key 100 (key K1) which is a random number generated by server 120.

Random decryption key 100 (K1), chip identifier 139, and more random filler bits are then block encrypted to produce encrypted key block 94 using a block encryption process 129 (which may be the same or similar to 133) under control of secret key K2 selected from secret key table 110 by key selection number 113. Key selection number 113, and encrypted key block 94 are downloaded, along with encrypted software 97, and non-encrypted software 96 to game console 42 which stores them into cartridge 16.

Figure 4:
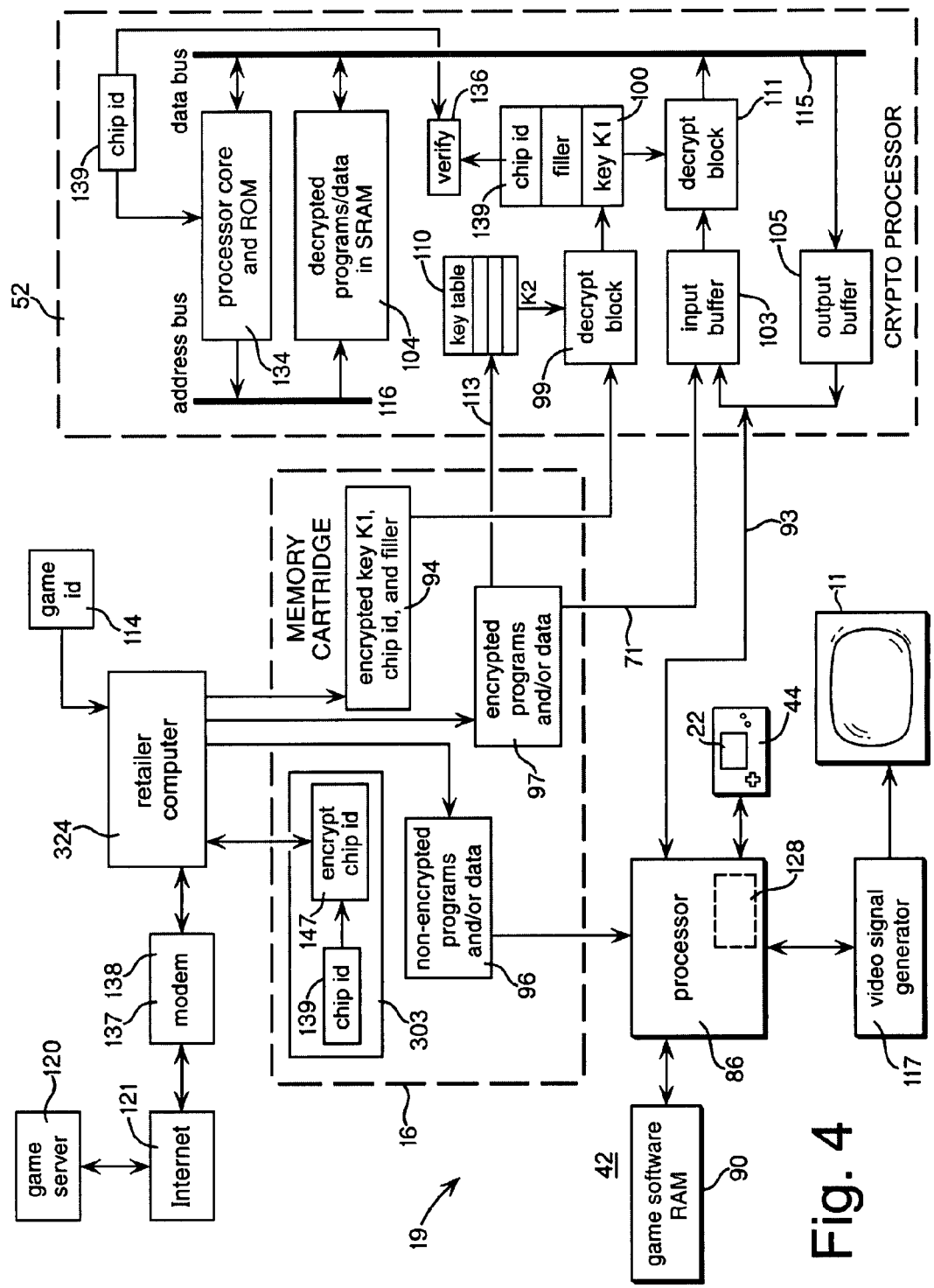
FIG. 4 is a block diagram of a game distribution system in which a retail computer helps transfers data between server 120 and cartridge 16.

FIG. 4 illustrates an embodiment of a video game system 19 that comprises components shown in FIG. 1 and also has an additional computer 324 operated by a retailer to transfer data between server 120 and memory cartridge 16. The user of video game console system 42 or portable game system 44 will take cartridge 16 to the retailer to buy game software downloaded from server 120 through the retailer's computer 324. Retailer computer 324 has software to access server 120 through the Internet 121 and/or other connection and to request purchase of game software specified by game identifier 114. Retail computer 324 also has a socket (not shown) into which cartridge 16 is inserted and electronic components (not shown) to store downloaded software through the socket into cartridge 16 memory which may be EEPROM, battery-powered SRAM and/or other data non-volatile storage media. Software in retail computer 324 would also include accounting programs to record monetary amounts payable to the owner of game software being downloaded from server 120.

Cartridge 16 has a second crypto processor 303 (described below with reference to FIG. 5) that transfers the value of chip identifier 139 to server 120 through retailer computer 324 using randomly generated session keys 304 to deter cryptanalysis. As described below with reference to FIG. 5, server process 311 generates a random session key 304 (K4) to control block decrypting process 142 which decrypts encrypted chip identifier 323. In FIG. 4 the unique binary value of chip identifier 139 in game system crypto processor 52 is the same value in cartridge crypto processor 303. Hence cartridge 16 crypto processor 303 and crypto processor 52 are a matched set that will operate correctly only if used together.

Block encryption process 147 in cartridge crypto processor 303 encrypts chip identifier 139 and transmits the encrypted chip id value through retailer computer 324 and the Internet 121 to server 120 which generates encrypted key block 94 as described above with reference to FIG. 2. Server 120 then downloads encrypted key block 94 through the Internet 121 and retailer computer 324 which stores encrypted key block 94 into cartridge 16 as shown in FIGS. 2 through 5. Server 120 also transmits encrypted software 97 and non-encrypted software 96 and 113 to retailer computer 324 which stores it into cartridge 16 memory. The user of cartridge 16 then inserts it into his game system and the data in cartridge 16 is decrypted by crypto processor 52 as described above with reference to FIG. 1.

Alternatively, retailer computer 324 may write downloaded encrypted game data onto a writable disk that can be read by a user's game system disk reader.

There is no need for retail computer 324 or cartridge 16 to be secure from tampering because encrypted program data 97 and encrypted key block 94 and encrypted chip identifier 323 pass through retailer computer 324 without change. Even if multiple copies were made of the software in cartridge 16, the programs and data would be usable only in the game system that contains crypto processor 52 with a corresponding chip identifier 139. If any alterations or substitutions were made to the encrypted data processed by retail computer 324, the data would be unusable.

Figure 5:
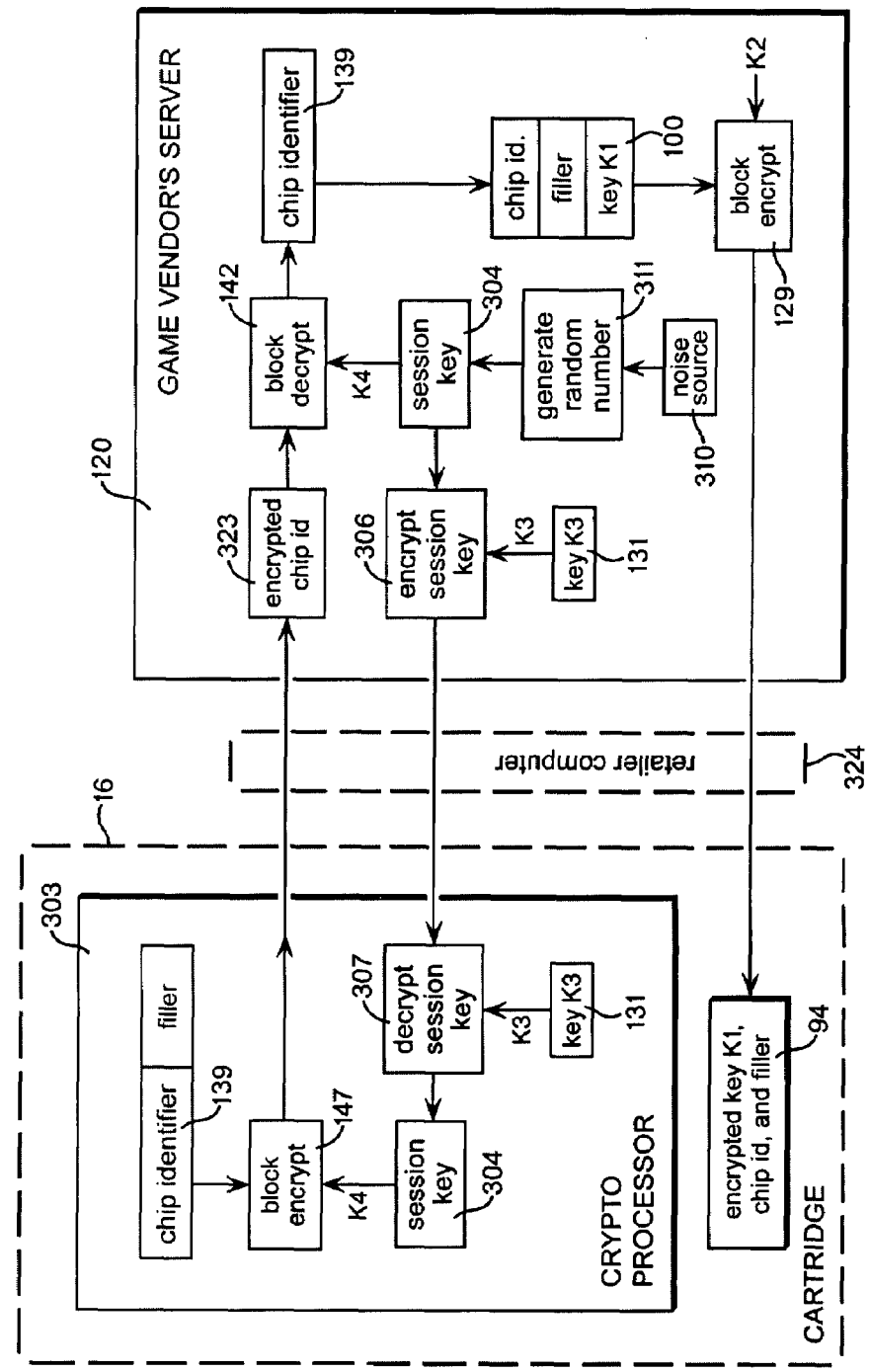
FIG. 5 is a block diagram of crypto communications between the game server and the memory cartridge 16 crypto processor chip 303 shown in FIG. 4.

FIG. 5 illustrates in greater detail crypto communications between game server 120 and crypto processor chip 303 in memory cartridge 16. FIG. 5 repeats some of the processing shown in FIG. 3 but shows in greater detail how chip identifier 139 is transmitted in encrypted form from crypto processor 303 to game server 120 using a random session key. After random number generator 311 generates session key 304 for decryption process 142 as shown in both FIGS. 3 and 5, the same session key 304 is further encrypted by block encryption process 306 under control of key 131 (K3). Encrypted session key 306 is transferred through Internet 121 and retailer computer 324 to crypto processor 303 which decrypts the encrypted session key in process 307 under control of the same key 131 (K3) which is permanently stored in processor chip 303. Decryption process 307 produces the plain decrypted session key 304 (K4) which controls block encryption process 147.

Encryption process 147 encrypts chip identifier 139 together with randomly generated filler bits so that the block being encrypted is a full block (preferably 128 bits). Encrypted chip identifier 323 is transferred from crypto processor chip 303 through retailer computer 324 to server 120 where encrypted chip identifier 323 is decrypted by block decryption process 142 under control of the same session key 304 mentioned above. Server process 129 then reencrypts chip identifier 139 together with key 100 (K1) to produce an encrypted block which server 120 transfers through Internet 121 and retail computer 324 which stores the encrypted key K1, chip identifier 139, and filler bits into non-volatile memory 94 in cartridge 16.

FIG. 6 is an example of a memory map of program instructions and data stored in boot ROM (not shown) in crypto processor 52 for execution and processing by processor core 134.

FIG. 6*a* is an example of a memory map of program instructions and data stored in boot ROM (not shown) in crypto processor 303 (FIGS. 4 and 5).

FIG. 7 is a memory map of RAM 90 (FIG. 1) for exemplary software. These program instructions and data are typical for conventional video games.

FIG. 7a is a memory map of RAM 96 (FIG. 1) for exemplary non-encrypted software downloaded from server 120. Software 96 would typically not include all software needed to play an enhancement level, but after downloading would be linked to software in RAM 90. Such a combination of software in RAM 90 and RAM 96 would provide new playable game levels.

FIG. 8 is a memory map that illustrates digital links (1, 2, 3, 4, 5, 6) between portions of non-encrypted software stored in RAM 90 (RAM A) and downloaded portions of non-encrypted software stored in RAM 96 (RAM B). Downloaded address table 140 of these digital links is reencrypted by a program in SRAM 104 (FIG. 1) and is sent from crypto processor 52 in reencrypted form on data bus 93 to processor 86 which decrypts table 140 and stores it in cache 128. The combined software in RAM A and RAM B in this example is not executable without decrypted table 140 in cache 128. Address table 140 in decrypted form is not stored in RAM 90 or RAM 96, nor is it accessible from processor 86 or data bus 93. Encrypted address table 140 is decrypted in processor 86 using program instructions already in cache 128 and/or ROM in processor 86.

Several other trade secret programs may be securely decrypted and stored in SRAM 104 (FIG. 1) in crypto chip 52 and executed in processor core 134. This may provide a proprietary method of character movement, character intelligence, special sound generation, or other game element that is difficult to reverse engineer and program and therefore may provide a competitive advantage if securely executed in crypto processor 52.

In the examples described herein, block encryption and decryption used in processes 99, 111, 142, 147, 306, 307 operate on blocks of at least 64 bits under control of symmetrical keys of at least 64 bits and preferably 128 bits. Such block encryption may use block encryption methods such as the Data Encryption Standard (DES), AES, or similar methods, so that changing any one bit of plaintext affects all bits of ciphertext in an encrypted block, changing any one bit of ciphertext affects all bits of plaintext in a decrypted block, and changing any one bit of an encryption key affects all bits of plaintext in the block, without providing clues that would lead to discovery of the bit values of the secret key through chosen ciphertext attack, chosen encrypted key attack, toggling of bits in ciphertext or encrypted key, differential cryptanalysis, differential fault analysis, and other cryptanalysis techniques. DES is described in detail in Federal Information Processing Standard (FIPS) 46, Nov. 23, 1977; and in FIPS PUB 46-3, Oct. 25, 1999.

DES is considered obsolete because it has been successfully cracked using differential cryptanalysis with massive amounts of plaintext-ciphertext pairs. But in the present invention, there need not be any plaintext-ciphertext pairs. The decrypted programs are stored in SRAM 104 and are not revealed outside of crypto processor 52. Likewise much of the data goes no farther than RAM 104 and processor core 134. By encrypting only program instructions and literal data in instructions, but leaving unencrypted the data that is transferred on bus 93 to processor 86 in FIG. 1, there will be no plaintext-ciphertext pairs that a pirate could use in a cryptanalysis attack. Without known plaintext, DES is more than adequate for this application.

Simplified variations of DES may therefore be used for the present block encryption/decryption processes. The initial permutation IP and the inverse permutation $IP^{-1}$ can be removed because they were apparently designed for use with ASCII text messages. Executable program instructions are not ASCII and are not text messages. The DES key schedule can also be removed because it was designed to limit the key to 56 bits, a limitation that was subsequently relaxed.

Although encrypted data is accessible on buses, encryption of variable session keys prevents access to encrypted-unencrypted pairs. Hence keys K1, K2, and K3 would be very difficult to discover.

Symmetric key block encryption uses the same secret key for decryption and for encryption. Typically this key is at least 64 bits and preferably 128 bits or larger. In the preferred embodiment, there is not one master key in processors 303 or 52, because if it were compromised, perhaps by an employee or contractor of the game vendor, the processors would become useless. Instead, in the preferred embodiment, each of crypto processors 303 and 52 includes key table 110 so that secret key K2 and K3 can be changed in mid production of any game title by changing to a different key in the table. If the key bits in table 110 are intermingled with unused random decoy bits, anybody who accesses the bits will not know which bits are key bits without also reading the on-chip ROM or RAM program that access bits that are key among bits that are decoys and reconstruct their sequence.

Key table 110 in processors 303 and 52 may be stored in an SRAM powered by a battery, so that attempts to probe, scan, or peel processor chips 303 or 126 would break a power trace and destroy the keys in table 110. If key table 110 were mask programmed or stored in EEPROM or flash ROM, that would reduce security of the keys, unless the key bits were rearranged and/or distributed among decoy bits. Keys should not be externally readable or changeable in crypto processors 303 or 52. Key table 110 should be physically protected against probing, chip peeling, scanning electron microscopy, and voltage-contrast imaging. Physical security for chip keys is described in detail in my U.S. Pat. No. 4,278,837 for crypto microprocessors that use bus encryption.

Processor core 134, includes an ALU, registers, a stack, instruction decoder, and a program counter to address each executable instruction in sequence in a ROM and SRAM 104, fetch each instruction, and increment the program counter to address the location of the next instruction.

Crypto processor 52 in this example, executes decrypted programs stored in SRAM 104 that generate intermediate game data that may represent variable characteristics of one or more player controlled objects or characters, and/or non-player objects that move across a background, and/or 2D or 3D views of a simulated world. The game data generated in processor 52 may represent positions, locations, and directions of player controlled game objects such as characters with articulated arms and legs and predefined textures. Even if animation of arms and legs is performed by a graphics coprocessor, the spatial coordinates, orientation, and direction of movement of the character may be specified by processor 52 executing the decrypted program instructions in SRAM 104.

The game data generated in crypto processor 52 may also represent positions, locations, and directions of points of view, and may also represent game scores, game status, maps, statistics, object selection, icons, verbal descriptions, instructions, menus, other displayable data, and/or signals to trigger music, voice sounds, and sound effects.

Data representing background scenery in 2D portable game systems may be unencrypted and loaded into RAM because backgrounds are easily readable or easily reconstructed by pirates. But the program instructions that determine when and what backgrounds are needed and what changes are made to backgrounds (such as a door remaining open) may be executed by crypto processor 52 from SRAM 104.

As used herein, the term "video" includes composite, non-composite, RGB, monochrome, color, analog, digital, raster-scanned, MPEG video, and the like.

The details of cartridge 16 and crypto processors 303 and 52 are given here only as examples and numerous other designs may be used.

The term "program" as used herein may consist of more than one loadable module and typically includes executable instruction data and any data that is typically part of a program module or modules.

The processes of encryption and decryption specified herein may be performed by software, i.e. program instructions executed in a processor core with data tables such as the S-boxes (substitution boxes) that are used in DES. Or the encryption and decryption may be performed in dedicated crypto hardware in the processor chips, or a combination of hardware and software in the processor chips. Encryption and decryption processes may be symmetric (for example DES) or non-symmetric (for example RSA) or a combination of symmetric and non-symmetric.

Although I have described my invention with a degree of particularity in connection with what is presently considered to be the most practical and preferred embodiments, the present disclosure has been made only by way of illustration and example and is not to be interpreted as restrictive or limiting as to the meaning of words in the patent or its claims. It is understood that various modifications, variations, arrangements, and/or equivalents, can be devised without departing from the spirit and scope of the invention which is defined by the claims.

REFERENCE NUMBERS IN DRAWINGS 11 television (TV) set or video monitor
16 memory cartridge
19 video game system generally
22 LCD screen
42 video game system console
44 portable game system
52 crypto processor
71 data bus connecting crypto processor
86 CPU processor in console
90 SRAM in crypto processor
93 data bus
94 encrypted block (key K1, game id, serial num)
96 non-encrypted programs and/or data in RAM
97 encrypted programs and/or data
98 secret key (K2)
99 process of block decryption (K2)
100 secret key (K1)
101 random filler bits
102 process of validating chip identifier
103 bus input buffer
104 decrypted program(s) and/or data in SRAM
105 bus output buffer
110 table of keys
111 process of block decrypting (K1)
113 key selection number
114 game product number
115 internal data bus
116 internal address bus
117 video signal generator
120 game vendor's server
121 the Internet or other data network
122 game software database
123 process of reading database
128 processor cache memory
129 process of block encryption (K2)
130 electric battery or cell
131 secret key (K3)
133 process of block encryption (K1)
134 processor core and ROM in crypto chip 52
136 verify game id or checksum
137 sending modem (modulator)
138 receiving modem (demodulator)
139 crypto chip identifier
140 address table in cache
142 process of block decryption (K4)
143 file of chip identifiers
147 process of block encryption (K4)
303 crypto processor
304 session key (K4)
306 process of block encryption (K3)
307 process of block decryption (K3)
310 thermal noise source
311 generate session key
313 boot ROM in crypto processor 303
323 encrypted chip identifier
324 retailer computer

I claim:

1. A method of securely distributing program instructions for execution in a single-chip secure cryptoprocessor that contains chip identifier data that distinguishes different cryptoprocessor units, encryption circuitry for encrypting said identifier, decryption circuitry for decrypting encrypted digital program instructions, writable program memory for storing decrypted instructions, and processor core for executing said decrypted instructions which are inaccessible from said secure cryptoprocessor chip from locations outside of said chip after fabrication of said chip is completed; the method comprising:

(a) encrypting in a network server a first program of executable digital instructions under control of a first encryption key;

(b) transmitting said encrypted first program of digital instructions from said server to said cryptoprocessor;

(c) encrypting said chip identifier in said cryptoprocessor chip to produce an encrypted identifier;

(d) transmitting said encrypted identifier to said server;

(e) reencrypting in said server said chip identifier together with a decryption key corresponding to said first encryption key to produce at least one encrypted data block such that each bit in said encrypted data block is a complex function of every bit in said decryption key and every bit in said chip identifier;

(f) transmitting said data block to said cryptoprocessor chip;

(g) decrypting said encrypted data block in said cryptoprocessor chip to produce a decrypted identifier and said decryption key in said cryptoprocessor chip;

(h) decrypting said encrypted first program in said cryptoprocessor chip under control of said decryption key to produce executable digital instructions stored in said program memory; and (i) executing said digital instructions in said processor core in said cryptoprocessor chip to generate output data if said decrypted identifier has a predetermined relationship with said chip identifier in said cryptoprocessor chip.

2. The method of claim 1, further comprising the steps of
(j) generating a session key in said server;
(k) transmitting said session key in encrypted form to said cryptoprocessor;
(l) decrypting said encrypted session key in said cryptoprocessor chip to produce a decrypted session key;
(m) encrypting said chip identifier in said cryptoprocessor chip under control of said decrypted session key to produce said encrypted identifier; and
(n) decrypting said encrypted identifier in said server under control of said session key to produce a decrypted identifier.

3. The method of claim 1, wherein said cryptoprocessor chip is a component in a video game system and said output data generated by said cryptoprocessor is game data that is processed by a graphics co-processor in said game system that generates graphics data for display on a display device.

4. The method of claim 1, wherein said cryptoprocessor chip is a component in a computer and said output data generated by said cryptoprocessor is address data that identifies memory locations of non-encrypted program instructions executed by a second processor in said computer.

5. The method of claim 1, wherein said cryptoprocessor chip communicates with a second processor through a data transmission path that comprises wireless transmission.

6. The method of claim 1, wherein said cryptoprocessor chip inhibits output of said executable digital instructions from said data memory to a location outside of said secure cryptoprocessor chip.

7. The method of claim 1, wherein said output data generated by said cryptoprocessor contain instructions that are executed by a second processor.

8. The method of claim 1, further comprising the step of downloading said encrypted first program of executable digital instructions and said encrypted data block through a retailer computer.

9. A computer readable data storage medium having stored thereon encrypted digital program instructions for execution in a single-chip secure cryptoprocessor that contains chip identifier data that distinguishes different cryptoprocessor units, encryption circuitry for encrypting said identifier, decryption circuitry for decrypting encrypted digital program instructions, writable program memory for storing decrypted instructions, and processor core for executing said decrypted instructions which are inaccessible from said secure cryptoprocessor chip from locations outside of said chip after fabrication of said chip is completed, wherein said cryptoprocessor chip performs the following:

(a) encrypting said chip identifier in said cryptoprocessor chip to produce an encrypted identifier for transmission to a network server that encrypts and downloads a first program of executable digital instructions for use in said cryptoprocessor, wherein said server decrypts said encrypted identifier to produce a decrypted identifier, and wherein said server reencrypts said decrypted identifier together with a decryption key corresponding to said encrypted first program to produce at least one encrypted data block for transmission to said cryptoprocessor chip such that each bit in said encrypted data block is a complex function of every bit in said decryption key and every bit in said chip identifier;

(b) decrypting said encrypted data block in said cryptoprocessor chip to produce a decryption key in said cryptoprocessor chip;

(c) decrypting said encrypted first program in said cryptoprocessor chip under control of said decryption key to produce executable digital instructions stored in said program memory; and (d) executing said digital instructions in said processor core in said cryptoprocessor chip to generate output data if said decrypted identifier has a predetermined relationship with said chip identifier in said cryptoprocessor chip.

10. The data storage medium of claim 9, further storing nonencrypted digital program instructions for execution in a second processor that processes said output data from said cryptoprocessor chip and generates second data that is processed by said cryptoprocessor chip.

11. The data storage medium of claim 9, further storing said encrypted data block in said data storage medium.

12. A single-chip secure cryptoprocessor comprising:
(a) non-volatile data memory storing chip identifier data that distinguishes different cryptoprocessor chips;
(b) encryption circuitry for encrypting said chip identifier to produce an encrypted identifier for transmission to a network server;
(c) wherein said server encrypts and downloads a first program of executable digital instructions for use in said cryptoprocessor, wherein said server decrypts said encrypted identifier to produce a decrypted identifier, and wherein said server reencrypts said decrypted identifier together with a digital decryption key corresponding to said encrypted first program to produce at least one encrypted data block for use in said cryptoprocessor chip such that each bit in said encrypted data block is a complex function of every bit in said decryption key and every bit in said chip identifier;
(d) decryption circuitry for decrypting said encrypted data block to produce a decrypted key;
(e) writable data memory for storing said decrypted key;
(f) decryption circuitry for decrypting said first program under control of said decrypted key to produce executable digital decrypted instructions;
(g) writable program memory for storing said decrypted instructions;
(h) processor core for executing said decrypted instructions to produce output data if said decrypted identifier has a predetermined relationship with said chip identifier; and
(i) wherein said data memory, encryption circuitry, decryption circuitry, processor core, program memory, and decrypted instructions are inaccessible from said secure cryptoprocessor chip from locations outside of said secure cryptoprocessor chip after fabrication of said chip is completed.

13. The cryptoprocessor chip of claim 12, wherein said cryptoprocessor chip communicates with a second processor through a data transmission link that comprises wireless transmission.

14. The cryptoprocessor chip of claim 12, wherein said output data is processed by a second processor in one of the group comprising: a video game system, a handheld game system, and a computer.

15. The cryptoprocessor chip of claim 12, wherein said cryptoprocessor chip is a component in one of the group comprising: a video game system, a handheld game system, and a computer.

16. The cryptoprocessor chip of claim 12, wherein said writable program memory is non-volatile.

* * * * *